United States Patent [19]

Goodson

[11] Patent Number: 5,257,459
[45] Date of Patent: Nov. 2, 1993

[54] UTILITY KNIFE FOR ELECTRIC CABLES

[76] Inventor: James J. Goodson, 714 N. Illinois Street, Plainfield, Ill. 60544

[21] Appl. No.: 929,996

[22] Filed: Aug. 13, 1992

[51] Int. Cl.$^5$ ............................................. B26B 3/00
[52] U.S. Cl. .................................... 30/313; 30/90.1
[58] Field of Search ............. 30/312, 313, 90.1, 90.4, 30/90.2

[56] References Cited

U.S. PATENT DOCUMENTS

| | | | |
|---|---|---|---|
| 361,176 | 4/1887 | McDermott | 30/313 |
| 1,051,526 | 1/1913 | Thomas | 30/313 |
| 1,062,310 | 5/1913 | Waite | 30/90.4 |
| 1,187,386 | 6/1916 | Pehrson | 30/90.1 |
| 1,540,938 | 6/1925 | Gordon | 30/313 |
| 1,661,056 | 2/1928 | Stack | 30/90.4 |
| 2,071,691 | 2/1937 | Hayford | 30/313 |
| 2,694,255 | 11/1954 | Hancock | 30/313 |
| 4,507,867 | 4/1985 | Haas, Jr. | 30/90.4 |

FOREIGN PATENT DOCUMENTS

| | | | |
|---|---|---|---|
| 22023 | 10/1947 | Finland | 30/313 |
| 120390 | 12/1947 | Finland | 30/313 |

*Primary Examiner*—Douglas D. Watts
*Assistant Examiner*—Hwei-Siu Payer
*Attorney, Agent, or Firm*—Welsh & Katz, Ltd.

[57] ABSTRACT

A utility knife device for electric cables having an elongated blade member downwardly curved along its length and including a first and second end portion. A first handle is rigidly attached to the first end portion and a second handle is rigidly attached to the second end portion. The first handle and second handle are downwardly angled from a horizontal reference plane tangential with the top surface of the curved blade. The blade includes a sharpened front edge which is concavely shaped.

8 Claims, 2 Drawing Sheets

UTILITY KNIFE FOR ELECTRIC CABLES

BACKGROUND OF THE INVENTION

The present invention relates to apparatus for use with polymerically insulated electric cables and more specifically relates to a knife used to strip the protective jacket from a polymerically insulated cable.

Polymerically insulated cables are now the predominant cable construction type for both high voltage and low voltage power transmission. In low voltage applications, a tough polymeric jacket layer is extruded concentrically about the central conductor. The polymeric jacket serves to electrically insulate and environmentally protect the conductor.

In high voltage applications, one type of polymerically insulated high voltage cable, typically used by electric utilities, is commonly referred to as jacketed cable. The jacketed cable has a number of spirally wound metallic wires which form a centralized conductor. Concentrically disposed about the conductor is an insulation layer which electrically insulates the high voltage conductor from the surrounding environment. The insulation layer is surrounded by a concentric grounded non-metallic shield. Surrounding the shield and electrically connected to the shield is a series of concentric neutral conductors which are typically spaced about the circumference of the shield and spirally wound along the length of the cable. These concentric neutral wires function to ensure the non-metallic shield is grounded along the entire length of the cable and to conduct any leakage current away from breaks in the insulation layer. To protect the non-metallic shield and insulation layer from the intrusion of water or physical objects, the concentric neutral wires are surrounded by a tough resilient polymeric jacket. In the manufacture of high voltage polymeric cable, the protective jacket is extruded about the concentric neutral cables and non-metallic shield very tightly to remove any possibility of entrapped air bubbles.

The insulation layer is designed to adequately prevent any leakage of current from the high voltage conductor to the grounded exterior The insulating layer's thickness and material selection is predicated on the non-metallic shield circumferentially surrounding the insulating layer in a smooth concentric distribution. If there is any removal of or breaks in the non-metallic shield, a high voltage stress gradient can develop which may cause a steady degradation of the insulation layer until sufficient current can penetrate the layer thereby causing a cable failure. These cable failures are very costly not only from the expense of repairing the cable but also due to the deprivation of electric power to the location to which the cable was supplying power.

It is well known that these type of cable failure where there has been a break in the non-metallic shield typically occurs at points where the cable has been either spliced or terminated for connection to an electrical apparatus. One reason for a cable failure is faulty preparation of the cable prior to the splicing or terminating of the cable. Proper preparation of the cable requires the outer jacket to be carefully stripped back to prevent the destruction or disturbance of the non-metallic shield.

To prepare high and low voltage cable, a significant circumferential portion of the protective jacket must be removed along the length of the cable by slicing. Then the remaining jacket along the sliced portion is grasped and circumferentially peeled from the cable. If an insufficient portion of cable is removed during the slicing step, the peeling step may be impossible thus necessitating additional slicing. The two step stripping operation is often performed in environments such as darkened manholes or far above the ground along insulated power lines which make the stripping operation even more difficult.

The principle device for stripping the protective jacket from a high or low voltage cable is the common pocket knife. This device is favored because it is easily transportable and can be sharpened with ordinary sharpening stones.

The pocket knife, however, has significant drawbacks in its use as a cable stripping or preparation tool. The principle drawback is that the straight edge of the blade of the knife is ill-suited for stripping a jacketed cable having a circular periphery. During the slicing operation, the straight blade edge will typically not remove a large enough circumferential portion of the protective jacket to allow the remaining circumferential portion to be peeled away. Therefore, extra slicing steps along the cable are needed to remove additional amounts of jacket.

Another drawback is that the knife has a handle on only one side of the blade. Therefore, as the worker draws the blade longitudinally along the length of the cable, the knife will frequently pivot about a vertical axis and cause the blade to bind in the insulation or slide off the cable. Upon the knife sliding off the cable, the blade may strike a worker and cause injury.

A related drawback is the knife's singular handle may not allow the cutting angle of the blade relative to the neutral conductors to be adequately controlled as the blade is drawn along the cable. The lack of control of the cutting angle may cause the blade to cut into the neutral conductors and damage the cable or skip radially outward from the neutral conductors thereby leaving a residue of jacket which may hinder or prevent the peeling removal of the remaining circumferential portion of jacket. Also, should the blade slice through the neutral conductors, the ends of the conductors may form sharp points which will damage the heat shrink tubing generally employed to environmentally seal the completed splice or termination.

A further drawback is that the knife has a pointed tip and as the blade is drawn along the high voltage cable, the tip may dig into the non-metallic shield and damage the shielding layer, which as before-mentioned, could cause the cable to eventually fail.

The above listed drawbacks lengthen the time and effort to strip the protective jacket from the cable which may cause worker fatigue.

Thus, there is a need for a device to quickly and easily remove a significant circumferential portion of the exterior protective jacket on jacketed cables and allow removal of the remaining jacket by peeling about the circumference of the cable. There is also a need for a device which is easily transportable and yet can slice away this significant portion without pivoting, making irregular cuts and creating an injury hazard. There is a further need for a device which does not have a sharpened tip which may penetrate and damage the non-metallic shield in high voltage cables.

It is therefore an object of the present invention to provide a device for use with polymerically insulated cable. It is a related object to provide such a device to strip the protective jacket from a polymerically insulated cable which is easily transportable.

It is an additional object of the present invention to provide a device for stripping a jacketed cable having a circular periphery by removing a significant exterior portion of the jacket in a single slice thus eliminating extra slicing steps.

It is a further object of the present invention to provide a device which may be drawn along the cable without pivoting about a vertical axis, thereby causing the device to bind in the jacket or slide off the cable and create a safety hazard.

It is a still further object of the present invention to provide a device in which the cutting angle between the device and the neutral conductors may be easily and accurately controlled to prevent the damaging of the cable or the leaving behind of jacket residue after slicing away a portion of the cable.

It is a still further object of the present invention to provide such a device which does not include a sharpened tip which may damage the non-metallic shield of a high voltage cable.

SUMMARY OF THE INVENTION

Accordingly, the present invention provides a utility knife device for electric cables having a curved sharpened cutting blade with handles rigidly attached to both ends of the blade. The handles allow the device to be grasped by both hands and accurately pulled along the length of the cable to remove a significant circumferential portion of the protective jacket without compromising the interior layers of the cable. The handles also allow the blade to easily and accurately controlled as the blade initially slices into the cable and is drawn along the cable. The portion of jacket removed by the device allows the worker to grasp the remaining circumferential portion of the protective jacket and peel it from the cable.

More specifically, the present utility knife device includes an elongated blade member downwardly curved along its length and having a first and second end portion. A first handle is rigidly attached to the first end portion and a second handle is rigidly attached to the second end portion. The first handle and second handle are downwardly angled from a horizontal reference plane tangential with the top surface of the curved blade. The blade includes a sharpened front edge which is concavely shaped.

DESCRIPTION OF THE PREFERRED EMBODIMENT

Figure 1:
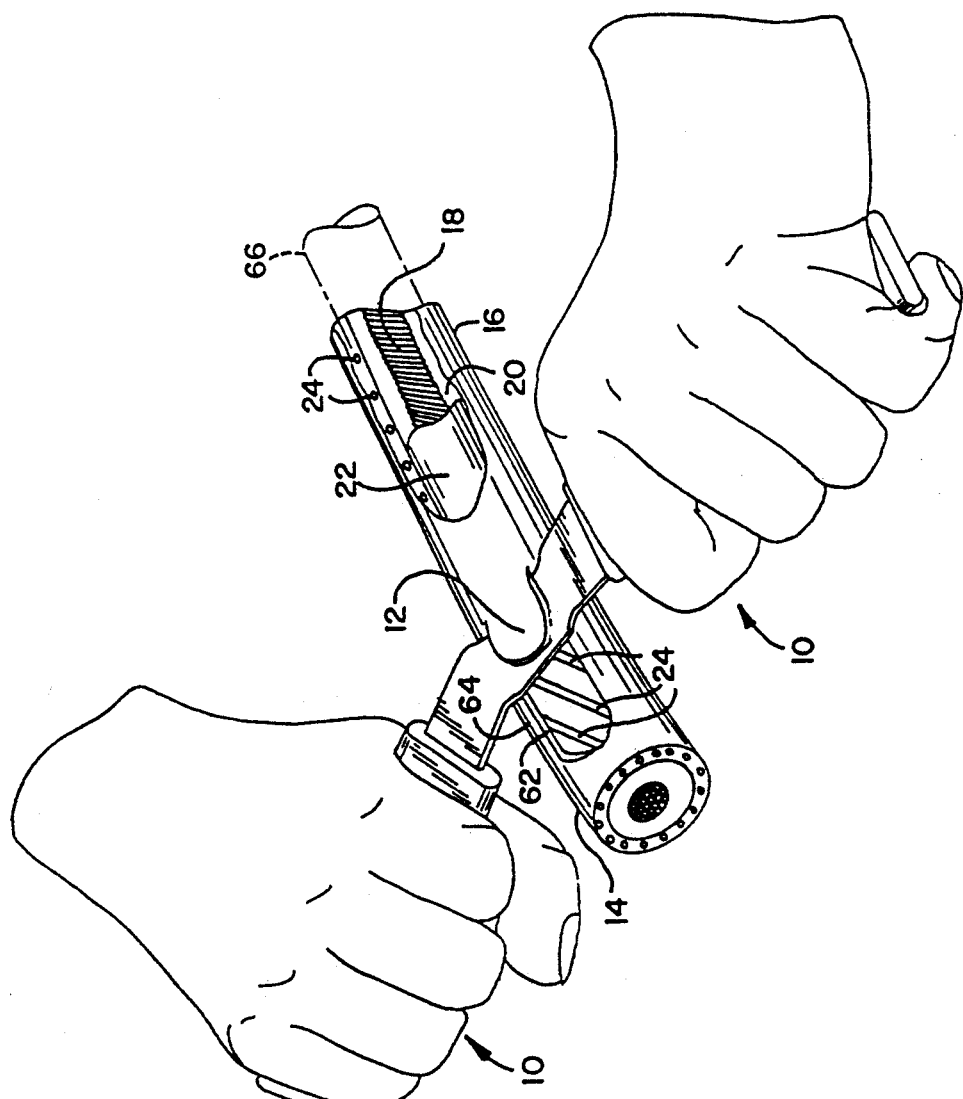
FIG. 1 is a perspective view with parts broken away of a knife of the present invention, shown slicing an insulating jacket of a high voltage cable.

Referring now to FIG. 1, a protective jacket stripping knife of the present invention is shown at 10. The knife 10 is shown removing a circumferential portion 12 of a protective jacket 14 of a jacketed cable 16 by slicing the jacket 14. The cable 16 illustrated is a high voltage cable and includes a central conductor 18 surrounded by an insulating layer 20. The insulated layer 20 is circumferentially surrounded by a nonmetallic shielding layer 22. Circumferentially spaced about and electrically connected with the shielding layer 22 is a plurality of concentric neutral conductors 24 which are spirally wound along the length of the cable 16. Circumferentially encompassing the neutral conductors 24 is the protective jacket 14. In order to splice or terminate the cable 16, the protective jacket 14 must be removed to expose the neutral conductors 24.

Figure 2:
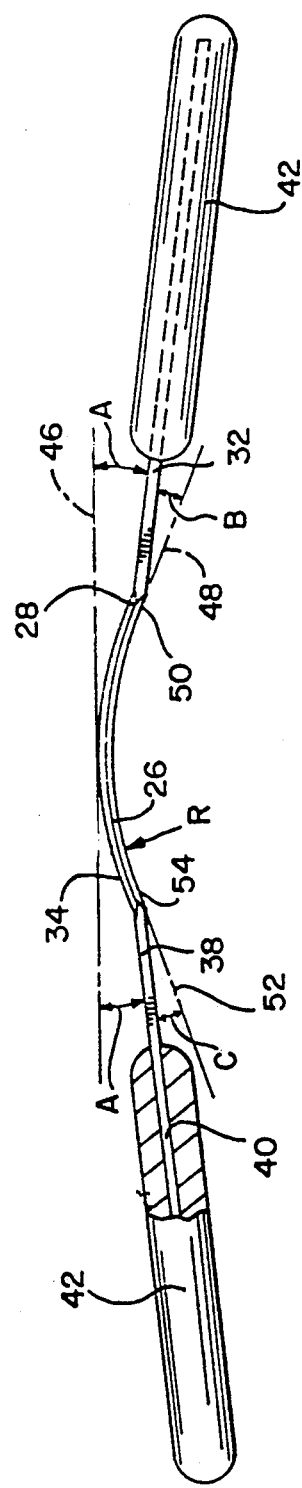
FIG. 2 is a front elevational view with parts broken away of the knife of FIG. 1.

Referring to FIG. 2, the knife 10 includes a central blade 26 having a right or first end portion 28 rigidly secured to a longitudinally extending right or first handle 32. The blade 26 is downwardly curved along its length with the radius of curvature R related to the diameter of the cable 16. The angle between the blade 26 and neutral conductors 24 (FIG. 1) defines a cutting angle. Rigidly attached to a left or second end portion 34 of the blade 26 is a left second handle 38, which is longitudinally aligned with the right handle 32.

The right handle 32 and left handle 38 may be any suitable construction which allows the blade 26 to be drawn along the length of an insulating cable while controlling the cutting angle. In the preferred embodiment, the right and left handles 32 and 38 include a generally planar metallic core 40 integrally formed along with the blade member 26 in a typical metal stamping operation. A resilient polymeric cladding 42 may be provided about the metallic core for comfort.

As shown in FIG. 2, the right handle 32 and left handle 38 are downwardly inclined relative to a horizontal reference plane 46 tangent to the blade 26 preferably at opposite angles thereby defining a first angle of inclination A. The first angle of inclination A is preferably about 7° but may range from 3° to 10°.

Also referring to FIG. 2, the right handle 32 is upwardly inclined relative to a second plane 48 tangent to the lower surface 50 of the right end 28 of the blade 26 thereby defining a second angle of inclination B. Similarly, the left handle 38 is upwardly inclined relative to a third plane 52 tangent to the lower surface 54 of the left end 34 of the blade member 26 thereby defining a third angle of inclination C. The second angle of inclination B is typically similar to the third angle of inclination C.

Figure 3:
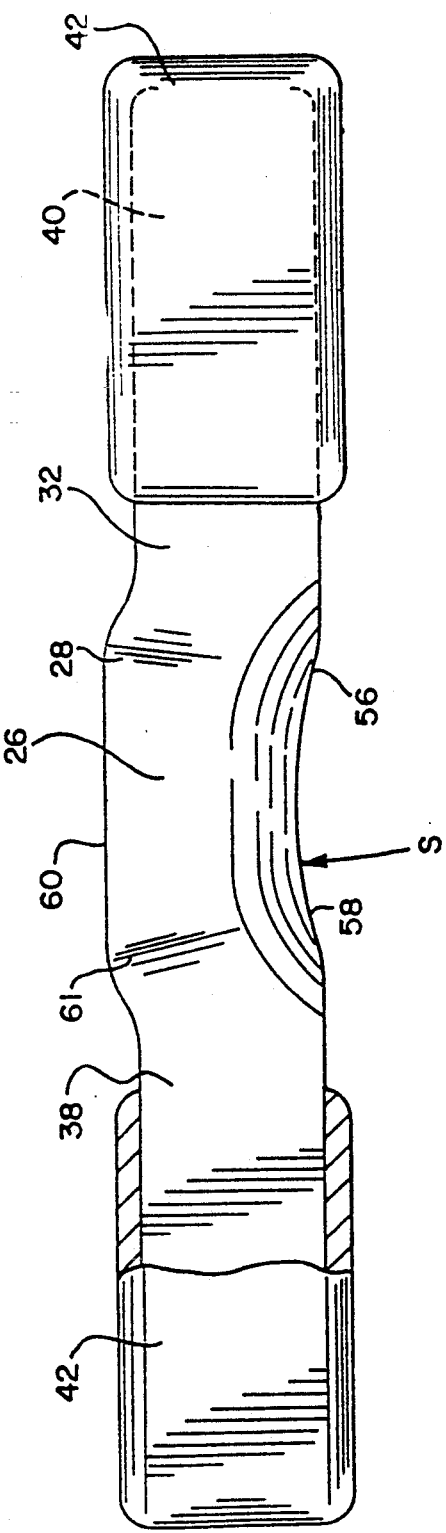
FIG. 3 is a top plan view of the knife of FIG. 1.

Referring to FIG. 3, the blade 26 has a sharpened front cutting edge 56. The cutting edge 56 includes a portion 58 concavely curved with a radius of curvature S. The radius of curvature is related to the diameter of the cable 16. This curved portion 58 centers the blade 26 on the cable and stabilizes the blade. This relationship between the radius of curvature S and the diameter of the cable 16 is important to impart the necessary stability to the blade 26 with the radius of curvature S preferably being approximately two times (2×) the diameter of the jacket. To supply additional strength to the blade 26, the rearward edge 60 of the blade may include a rearwardly extending lip 61, although this configuration is not necessary for the operation of the invention.

Referring to FIGS. 1, 2, and 3, in operation, the knife 10 is initially positioned so that the curved portion 58 of the cutting edge 56 engages the protective jacket 14 of the cable at a predetermined distance from the end of the cable. The blade 26 initially has a steep cutting angle to direct the cutting edge 56 toward the current conductor 18 of the cable 16. Drawing the knife 10 at this initial steep cutting angle of the blade 26 causes the cutting edge 56 to penetrate the protective jacket 14 until the cutting edge contacts a plurality of the neutral conductors 24 about a portion of the circumference of the cable. The right handle 32 and left handle 38 then allow the blade 26 to be easily rotated so that the blade assumes a gradual cutting angle so that the blade is almost parallel to the neutral conductors 24. In addition, as the blade 26 is being rotated the curvature of the blade causes the blade to fit within the cut established by the curved cutting edge 56 which eases the effort required to rotate the blade. The knife 10 is then longitudinally drawn along the length of the cable 16 toward the end of the cable with the left handle 38 and right handle 32 allowing the user to control the knife 10 to minimize any pivoting of the blade 26 about a vertical axis transverse to the longitudinal length of the cable. Also, as the knife 10 is pulled along the cable 16, the curved blade causes the cutting edge 56 to contact and scrape along a plurality of the neutral conductors 24 extending about a circumferential portion of the cable 16, thereby slicing off a significant circumferential portion 12 of the protective jacket 14. Thus, the curvature of the blade 26 allows the cutting edge 56 to remove a larger circumferential portion of the protective jacket 14 than a straight blade would allow.

As the knife 10 is pulled along the cable 16 until the end of the cable has been reached, the downward inclination of the right and left handle 32, 38 relative to reference plane 46 acts to apply a downward force to the knife 10. The right and left handle 32, 38 also control the cutting angle so that the cutting edge 56 is kept at the gradual cutting angle to the neutral conductors 24. The downward force and cutting angle maintain the scraping contact between the neutral conductors 24 and the cutting edge 56. Maintaining the scraping contact is important, for if the cutting edge 56 skips off the neutral conductors 24, a residue of protective jacket 14 will remain which greatly hinders the subsequent peeling operation. The contact between the cutting edge 56 and neutral conductors 24 guides the blade 26 along the length of the cable 16 as the knife 10 is being drawn and the gradual cutting angle prevents the blade from damaging the neutral conductors 24 or non-metallic shield 22.

The upward inclination of the right handle 32 and left handle 38 relative to second plane 48 and third plane 52 respectively causes the cutting edge 56 to create an edge 62 of the remaining circumferential portion 64 of the protective jacket 14 which is inclined at a secant angle relative to a circular periphery 66 defined by the neutral conductors 24. This edge 62 can be easily grasped by pliers or other convenient means in the subsequent peeling operation to remove the remaining circumferential portion 64 of the protective jacket 14. Therefore the protective jacket 14 can be quickly stripped from a jacketed cable 16 with a minimum of effort which reduces worker fatigue.

The knife 10 can also be employed in a manner similar to that described above to strip a low voltage cable (not shown) in which the protective jacker encompasses the current carrying central conductors.

A specific embodiment of the novel utility knife for electric cables according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. A device for stripping a protective jacket from an electric cable having an outside diameter, said device comprising:

an elongated horizontally extending blade member of permanent configuration, said blade member including a planar left end portion, a planar right end portion and a middle portion intermediate said left portion and said right portion, said middle portion having a curved top surface being downwardly curved along the length of said middle portion from a horizontal reference plane tangent to said curved top surface of said middle portion, said blade member also forming a sharpened forward concavely curved cutting edge extending over at least a portion of said middle portion, said curved cutting edge being between said left end portion and said right end portion;

left handle means rigidly attached to said left end portion, and a right handle means rigidly attached to said right end portion for drawing said sharpened cutting edge along the cable, and thus stripping a circumferential portion of the jacket.

2. The stripping device of claim 1 wherein said left handle means and said right handle means are downwardly inclined relative to said reference plane.

3. The device of claim 1 wherein said left handle means is upwardly inclined relative to a first reference plane tangent to said left end portion and said right handle means is upwardly inclined relative to a second reference plane tangent to said right end portion.

4. The device of claim 1 wherein said curved cutting edge defines a curve having a radius of curvature of about two times the diameter of the cable.

5. The device of claim 1 wherein said middle portion includes a rearward edge opposite said cutting edge, said curved rearward edge having a rearwardly extending lip.

6. The device of claim 1 wherein said left handle means is longitudinally aligned with said right handle means.

7. The device of claim 1 wherein said left handle means and said right handle means are downwardly inclined at an angle of between 3° to 10° relative to said reference plane.

8. A device for stripping a protective jacket from an electric cable having an outside diameter, said device comprising:

an elongated horizontally extending blade member of permanent configuration, said blade member having a planar first end portion and an opposite planar second end portion and a middle portion intermediate said first end portion and said second end portion, said middle portion having a curved top surface being downwardly curved along the length of said middle portion from a horizontal reference plane tangent to said curved top surface of said middle portion, said blade member also including a forward sharpened concave cutting edge which defines a curve having a radius of curvature of about two times the diameter of the cable, said curved cutting edge extending over at least a portion of said middle portion, said curved cutting edge being between said first end portion and said second end portion;

first handle means integrally attached to said first end portion, and a second handle means integrally attached to said second end portion, said first handle means being longitudinally aligned with said second handle means, said first handle means and said second handle means being downwardly inclined at opposite angles relative to said reference plane.

* * * * *